(12) United States Patent  
Muschett

(10) Patent No.: US 7,904,806 B2  
(45) Date of Patent: Mar. 8, 2011

(54) HIDING AN XML SOURCE IN METADATA TO SOLVE REFERENCE PROBLEMS NORMALLY REQUIRING MULTIPLE XML SOURCES

(75) Inventor: Brien H. Muschett, Palm Beach Gardens, FL (US)

(73) Assignee: International Business Machines Corporation, Armonk, NY (US)

( * ) Notice: Subject to any disclaimer, the term of this patent is extended or adjusted under 35 U.S.C. 154(b) by 1160 days.

(21) Appl. No.: 11/537,750

(22) Filed: Oct. 2, 2006

(65) Prior Publication Data

US 2008/0154575 A1  Jun. 26, 2008

(51) Int. Cl.
G06F 17/20 (2006.01)
(52) U.S. Cl. .................................................... 715/236
(58) Field of Classification Search .................. 715/236
See application file for complete search history.

(56) References Cited

U.S. PATENT DOCUMENTS

| | | | |
|---|---|---|---|
| 6,523,174 B1 | 2/2003 | Gould et al. | |
| 7,065,619 B1 | 6/2006 | Zhu et al. | |
| 7,620,643 B2 * | 11/2009 | Erhard et al. | 1/1 |
| 2003/0105884 A1 * | 6/2003 | Upton | 709/318 |
| 2003/0110315 A1 * | 6/2003 | Upton | 709/328 |
| 2003/0182452 A1 * | 9/2003 | Upton | 709/246 |
| 2005/0050000 A1 * | 3/2005 | Kwok et al. | 707/1 |
| 2005/0132282 A1 * | 6/2005 | Panditharadhya et al. | 715/516 |
| 2005/0165816 A1 | 7/2005 | Schiller et al. | |
| 2005/0216482 A1 | 9/2005 | Ponessa | |
| 2005/0240615 A1 | 10/2005 | Barsness et al. | |
| 2005/0251518 A1 | 11/2005 | Padgett | |
| 2006/0026199 A1 | 2/2006 | Crea | |
| 2006/0062059 A1 | 3/2006 | Smith et al. | |
| 2006/0089948 A1 | 4/2006 | Picker et al. | |
| 2006/0106856 A1 * | 5/2006 | Bermender et al. | 707/102 |
| 2006/0265645 A1 * | 11/2006 | Lee et al. | 715/523 |
| 2007/0124725 A1 * | 5/2007 | Wang et al. | 717/114 |
| 2008/0046254 A1 * | 2/2008 | Nuno et al. | 705/1 |

OTHER PUBLICATIONS

Title: Tip: Work with schemas and namespaces, Author: Brett McLaughlin, Date: Sep. 1, 2002, pp. 1-5 URL:<http://www.ibm.com/developerworks/xml/library/x-tipschnm.html>.*
Title: Speech Recognition Grammar Specification Version 1.0, Date: Mar. 16, 2004, pp. 1-94, URL: <http://www.w3.org/TR/2004/REC-speech-grammar-20040316/>.*

(Continued)

*Primary Examiner* — Doug Hutton
*Assistant Examiner* — Mustafa Amin
(74) *Attorney, Agent, or Firm* — Patents on Demand, P.A.; Brian K. Buchheit; Scott M. Garrett

(57) ABSTRACT

The present invention provides a solution that unifies independent data sources into a single data source by hiding one of the data sources in metadata. The non-hidden source, which can reference the hidden source, can be processed by a primary XML processing agent. This agent can initially ignore syntax and semantics of content associated with the hidden source, which is contained within the metadata. A secondary XML processing agent can transform the hidden source into a readable form, which is consumable by the primary processing agent. The primary XML processing agent can receive this readable form as a content stream. The primary XML processing agent can be unaware that the content stream originates from the unified source, which permits the unified source to represent multiple sources while preserving "rules" that typically prohibit multiple data types to be included in a single source.

15 Claims, 3 Drawing Sheets

OTHER PUBLICATIONS

Titile: Plan to use XML namespaces, Part 1, Author: David Marston, pp. 1-9, Date: Apr. 29, 2004, URL: <http://www.ibm.com/developerworks/library/x-nmspace1.html>.*

Titile: Plan to use XML namespaces, Part 2, Author: David Marston, pp. 1-7, Date: Apr. 29, 2004, URL: <http://www.ibm.com/developerworks/library/x-nmspace2.html>.*

Title: XML 2003 session report: News from the world of DSDL, Author: Uche Ogbuji, Date: Dec. 15, 2003, URL:<http://xmlhack.com/read.php?item=2120>.*

Martin, P., et al., "Using Metadata to Query Passive Data Sources", IEEE 1998, pp. 286-294.

* cited by examiner

```
        <?xml version="1.0" encoding="UTF-8"?>                                      200
        <grammar xmlns="http://www.w3.org/2001/06/grammar" xml:lang="en-US"
            xmlns:xsi="http://www.w3.org/2001/XMLSchema-instance"
            xsi:schemaLocation="http://www.w3.org/2001/06/grammar
                                http://www.w3.org/TR/speech-grammar/
grammar.xsd"
            version="1.0" mode="voice" root="enroll">
          <meta name="Creator" content="Brien Muschett"/>
          <meta http-equiv="Expires" content="0"/>
          <lexicon uri="http://widgets.acme.com/ibmveg.lexml"/> ──── Section
Section  <rule id="enroll" scope="public">                              202
 204  ⎰    <one-of>
           <item>slot0 <tag> $ = 0 </tag> </item>
           <item>slot1 <tag> $ = 1 </tag> </item>
         </one-of>
       </rule>
     </grammar>
```

```
        <?xml version="1.0" encoding="UTF-8"?>                                      220
        <!DOCTYPE lexicon PUBLIC "-//com/ibm/speech/grammar/lexicon//DTD Lexicon 1.0//EN"
        "ibmlexiconml.dtd">

<lexicon version="1.0" xml:lang="en-US" alphabet="x-ibmasren" case-sensitive="true">
          ⎡<lexeme>
Section  ⎢      <spelling>slot0</spelling>
 232   ⎨        <!-- sounds-like>Bob Smith</sounds-like -->                  Section
          ⎢     <phoneme>B AO B S M IH TH</phoneme>                           231
          ⎣</lexeme>
          ⎡<lexeme>
Section  ⎢      <spelling>slot1</spelling>
 233   ⎨        <!-- sounds-like>Mary Jenkins</sounds-like -->
          ⎢     <phoneme>M EH R IY JH EH NG K IH N S</phoneme>
          ⎣</lexeme>
        </lexicon>
```

```
        <?xml version="1.0" encoding="UTF-8"?>                                      240
        <grammar xmlns="http://www.w3.org/2001/06/grammar" xml:lang="en-US"
            xmlns:xsi="http://www.w3.org/2001/XMLSchema-instance"
            xsi:schemaLocation="http://www.w3.org/2001/06/grammar
                                http://www.w3.org/TR/speech-grammar/grammar.xsd"
            version="1.0" mode="voice" root="enroll">            Section 251
          <meta name="Creator" content="Brien Muschett"/>       /
          <meta http-equiv="Expires" content="0"/>
Section ⎡ <meta name="lexicon" content="version=1.0;xml:lang=en-US;alphabet=x-ibmasren;
 242  ⎨                           case-sensitive=true"/>              ── Section 252
          ⎣ <meta name="lexeme" content="spelling=slot0;phoneme=B AO B S M IH TH"/>
          <meta name="lexeme" content="spelling=slot1;phoneme=M EH R IY JH EH NG K IH N S"/>
                                                                              Section
          <lexicon uri="builtin:$this/meta/lexeme" type="application/x-ibm-lexicon+xml"/> 253
        ⎡ <rule id="enroll" scope="public">                        ── Section
Section ⎢    <one-of>                                                      255
 256  ⎨      <item>slot0 <tag> $ = 0 </tag> </item>
          ⎢  <item>slot1 <tag> $ = 1 </tag> </item>
          ⎢</one-of>
          ⎣</rule>
        </grammar>
```

FIG. 2

```
<?xml version="1.0" encoding="UTF-8"?>                                          300
<grammar version="1.0" mode="voice" root="enroll">
   <meta http-equiv="Expires" content="0"/>                   ———— 301
   <meta name="chksum" content="3030303038313233"/>
   <meta name="lexicon" content="version=1.0;xml:lang=en-US"/> ——— 302
   <meta name="lexeme" content="spelling=slot0;phoneme=B AO B S M IH TH"/> ——— 303
   <meta name="lexeme" content="spelling=slot0;phoneme=B AA B S M IH TH"/> ——— 304
   <meta name="lexeme" content="spelling=slot1;phoneme=M EH R IY JH EH K IH N"/>

<lexicon uri="builtin:$this/meta/lexeme"
            type="application/x-ibm-lexicon+xml"/>
   <rule id="enroll" scope="public">
      <one-of>
         <item>slot0<tag>$ = 0</tag></item>
         <item>slot1<tag>$ = 1</tag></item>
      </one-of>
   </rule>
</grammar>
```

```
<?xml version="1.0" encoding="UTF-8"?>                                          320
<!DOCTYPE lexicon PUBLIC "-//com/ibm/speech/grammar/lexicon//DTD Lexicon 1.0//EN"
                         "ibmlexiconxml.dtd">

<lexicon version="1.0" xml:lang="en-US">
   <lexeme>
      <spelling>slot0</spelling>
      <phoneme>B AO B S M IH TH</phoneme>
   </lexeme>
   <lexeme>
      <spelling>slot1</spelling>
      <phoneme>M EH R IY JH EH K IH N S</phoneme>
   </lexeme>
</lexicon>
```

FIG. 3

HIDING AN XML SOURCE IN METADATA TO SOLVE REFERENCE PROBLEMS NORMALLY REQUIRING MULTIPLE XML SOURCES

BACKGROUND

1. Field of the Invention

The present invention relates to an XML coding solution and, more particularly, to a solution that hides an XML source in metadata to solve reference problems normally requiring multiple XML sources.

2. Description of the Related Art

Many Extensible Markup Language (XML) based processors are able to process markup written in different XML languages. For example, a typical Voice XML processor is able to process Voice XML compliant code and Speech Recognition Grammar Specification (SRGS) compliant XML code. In another example, a typical SRGS processor is able to process SRGS compliant code and Pronunciation Lexicon Specification (PLS) compliant code. XML processors often use different processing agents or protocol handlers for processing different languages. A primary processing agent generally coordinates all XML code processing.

Conventionally, when different agents are processing different types of XML, each type of XML will have to be contained within an independent data source. This requires separate XML documents to be created, maintained, linked, and to be otherwise handled by an XML processor.

To illustrate the above situation, speech grammars often utilize pronunciation lexicons. When the grammar is an element of SRGS compliant code and the lexicon is written in PLS compliant XML, the SRGS document is unable to internally (using standard techniques) access a lexicon element. Instead, a separate lexicon XML document must exist that is external to the SRGS compliant document. That is, the primary processing agent (SRGS processing agent) can handle the lexicon when the lexicon is provided as an external source, with the external source being handled by a different processing agent (PLS processing agent).

SUMMARY OF THE INVENTION

The present invention provides a solution that unifies independent data sources into a single data source by hiding one of the data sources in metadata. The no-hidden source, which can reference the hidden source, can be processed by a primary XML processing agent. This agent can initially "ignore" the hidden source contained within the metadata, which is later referenced by the primary agent and is received as a transformed version that has been processed by a secondary processing agent. That is, the primary agent can report the metadata to a container agent, which can be a secondary agent responsible for building/transforming the content into its original (non-hidden) form. Later, the primary processing agent can request the transformed content. The container agent can feed this content back to the primary processing agent in the original (non-hidden) form as if the content were from an external source.

The present invention can be implemented in accordance with numerous aspects consistent with material presented herein. For example, one aspect of the present invention can include a method for permitting a single XML source to emulate multiple XML sources. The method can identify a first XML source and a second XML source, where the first XML source references the second XML source. The second XML source can be incorporated as metadata within an XML document that includes the first XML source. The first XML source can reference the second XML source in such a manner that the second XML source is automatically transformed by an XML processor into a format usable by the first XML source. The usable format can be one that is digestible by a processing agent the handles the first XML source. The method is able to operate even when standards for the first XML source require that the second XML source be processed as a source external to the first XML source.

Another aspect of the present invention can include an XML document that includes a first section conforming to an SRGS based language and a metadata section. The metadata section can contain content for a pronunciation lexicon. The first section can include references to the pronunciation lexicon contained in the metadata section. After being referenced, a lexicon document can be dynamically created from the metadata content by a protocol handler. The lexicon document can be passed to a grammar compiler that processes content of the first section. The grammar compiler can treat the lexicon document as an externally provided content source.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

FIG. 2 shows sample XML documents that illustrate metadata source hiding in accordance with an embodiment of the inventive arrangements described herein.

FIG. 3 shows additional XML documents and that illustrate using a single XML source to simulate multiple independent XML sources in accordance with an embodiment of the inventive arrangements described herein.

DETAILED DESCRIPTION OF THE INVENTION

Figure 1:
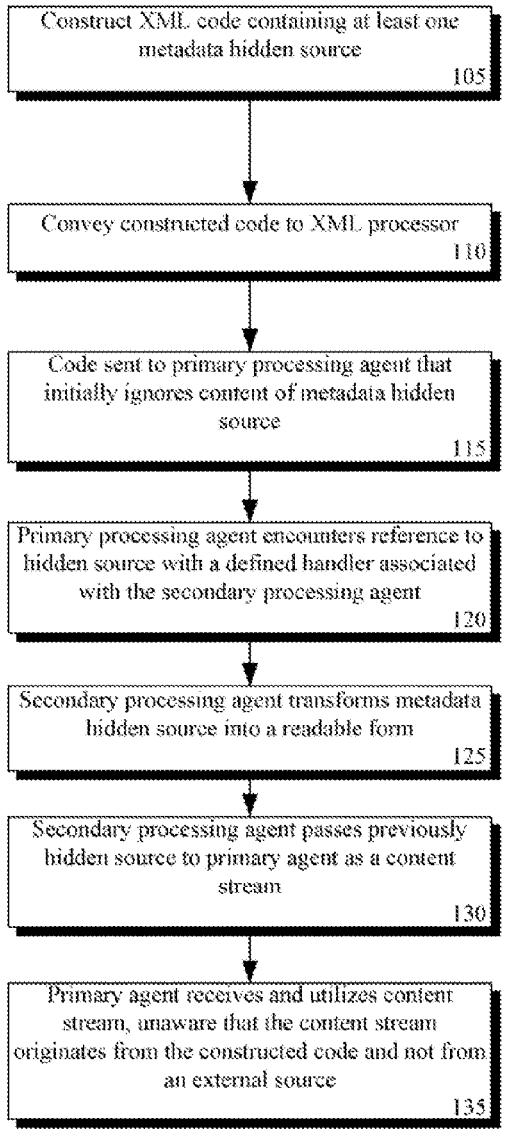
FIG. 1 is a schematic diagram showing a process flow and components for hiding an XML content source written in one XML language within another content source written in a different XML language so that an XML processor believes it is processing content from independent data sources when it is really processing content from a single unified source.
Figure 1:
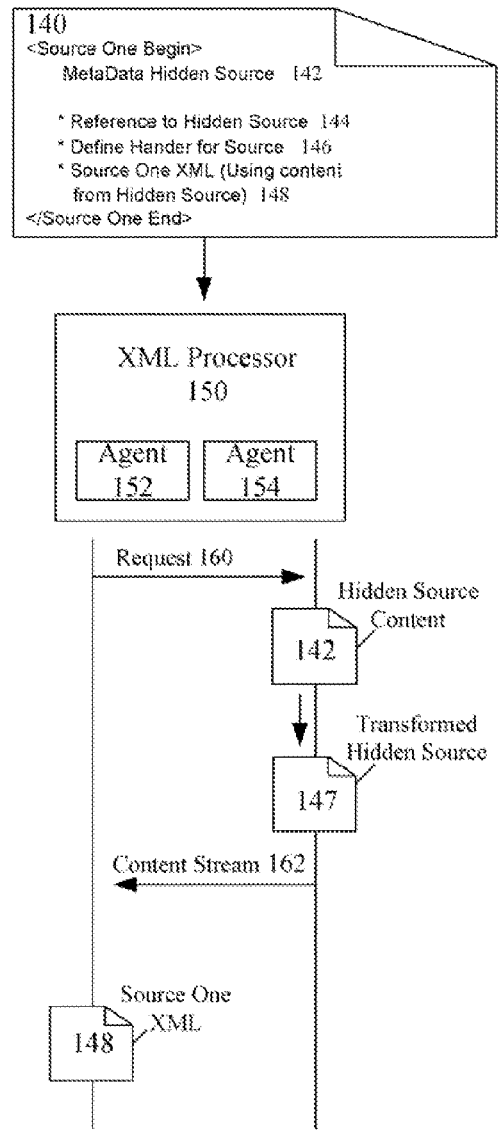

FIG. 1 is a schematic diagram showing a process flow and components for hiding an XML content source written in one XML language within another content source written in a different XML language so that an XML processor 150 believes it is processing content form independent data sources when it is really processing content from a single unified source. The process flow of FIG. 1 can include steps 105-135, where illustrated items 140-162 pictorially illustrate step details.

The process flow can begin in step 105, where XML code can be constructed that includes at least one metadata hidden source. For example, XML document 140 can be constructed, which includes a metadata hidden source 142. Another content source, referred to as Source One can reference the hidden source 144 and can define a handler 146 for the hidden source. Source One can then include XML code that uses content from the hidden source 148. For instance, Source One can be a Speech Recognition Grammar Specification (SRGS) compliant grammar element that uses a Pronunciation Lexicon Specification (PLS) compliant lexicon contained within the hidden source.

In step 110, the constructed XML document 140 can be conveyed to an XML processor 150. In step 115, the code can be initially sent to a primary processing agent 152 of the XML processor 150. Agent 152 can initially ignore the syntax and semantics of content contained in the metadata hidden source 142. That is, agent 152 can report the hidden content to agent 154, which is responsible for building/transforming the content into a non-hidden form, which is consumable by agent 152.

In step 120, the primary processing agent 152 can encounter a reference 144 to the hidden source 142. The reference 144 can define a handler 146 that is associated with a secondary processing agent 154 of XML processor 150. Responsive to the reference and the defined handler, agent 152 can request 160 content associated with the hidden source 142 from agent 154.

In step 125, the secondary processing agent 154 can transform 147 the metadata hidden source content 142 into a readable form. For example, the readable form can be a lexicon document. In step 130, the secondary processing agent 154 can pass the transformed source 147 to agent 152 as a content stream 162. The primary agent 152 can be unaware that the content stream 162 originates from document 140 and not from an external source. In step 135, the primary agent 152 can take programmatic actions in accordance with code associated with Source One 148, where that code can utilize the streamed content 162.

As used herein, the XML processor 150 can be a software module that handles input, output, and optionally supports validation and other such tasks. The metadata hidden source 142 can include elements and associated attributes that follow a metadata attribute or XML tag of Source One. The metadata tag can be an XML <meta> tag, a <metadata> tag, and any other tag defined for an XML compliant language that is used to define metadata. Metadata content by definition is ignored by agent 152, which allows source 142 to remain hidden until transformed by agent 154. The transformed source 147 is passed to agent 152.

FIG. 2 shows sample XML documents 200, 220, and 240 that illustrate metadata source hiding in accordance with an embodiment of the inventive arrangements described herein. Document 200 includes an SRGS grammar that references section 202 which is an external PLS lexicon of document 220.

Document 240 is a document containing a metadata hidden source 242. A protocol handling processing agent of an XML processor can transform the hidden source 242 into a lexicon document approximately equivalent to document 220. The non-hidden source of document 240 can then utilize the lexicon document. The transformation of the metadata hidden source 242 into a usable lexicon document can be conducted as described in FIG. 1, where document 200 is analogous to document 148; document 220 is analogous to document 147; and, document 240 is analogous to document 140.

In document 240, code section 251 corresponds to section 231 of document 220; section 252 corresponds to section 232; and, section 253 corresponds to section 233. Additionally, code section 255 corresponds to code section 202 and section 256 corresponds to section 204. Reference 255 uses a built-in handler that references the metadata hidden content. The built-in handler is a secondary processing agent that handles the specified protocol. In the case of the built-in handler, the associated agent is aware of the content enclosing the request and can satisfy a fetch request by transforming the metadata content into its non-hidden from, shown by document 220.

This technique permits an SRGS processing agent to be agnostic to metadata content and agnostic to the PLS processing agent. That is, the SRGS processing agent receives the expected lexicon format as content streamed from a location. It is unaware that the location is within the same document 240 that is being processed. Hence, the arrangement of FIG. 2 allows a single source of data (document 240) to represent multiple data sources (document 200 and document 220) while preserving the semantics of the SRGS language and the lexicon language.

FIG. 3 shows additional XML documents 300 and 320 that illustrate using a single XML source to simulate multiple independent XML sources in accordance with an embodiment of the inventive arrangements described herein. The particular format of document 300 can be referred to as a Personal-Grammar-URI (PGU) as defined by International Business Machines Corporation (IBM). The PGU is a grammar format built on standard SRGS XML that uses the <meta> elements to host acoustically-enrolled phonemes. These phonemes can be specially handled by IBM's server to build IBM's LexiconML documents. Notably, document 240 can be referred to as a PGU.

It should be noted that the lexicon allows lexicon attributes to be specified in a semi-colon separated manner. For example: "version=1.0;xml:lang=en-US" as shown by line 302. Additionally, the lexeme can allow phonemes to be added for a specific spelling, for example: "spelling=slot0; phoneme=B AO B S M IH TH" as shown by line 303. Multiple phonemes per spelling can be handled by multiple <meta> entries as shown by line 304. A PGU grammar can set itself for immediate expiration, by setting the http-equiv expires to zero as shown by line 301.

While processing this SRGS document, a grammar compiler, which is an XML processing agent, is expected to call upon services of the GrammarDocumentService provider for each meta data entry in document order. As shown in document 300, all <meta> entries must be reported prior to the request to resolve the resource described by the <lexicon> SRGS element. Upon processing the meta data, the lexicon and lexeme meta entries are consumed and used to build the lexicon document 320.

Document 320 can be passed to the grammar compiler as a result of the request for the builtin:$this/meta/lexeme request URI, triggered by the processing of the <lexicon> SRGS element. When compilation is terminated, the resulted binary package is stored in the grammar cache, as any other application grammar. This cache may not be reusable after the call is terminated. Hence, the PGU grammar is set for immediate expiration at line 301.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for permitting a single eXtensible Markup Language (XML) source to emulate multiple XML sources, each of the multiple XML sources being processed by a different XML processing agent of an XML processor, comprising:
    identifying a first XML source that is processed by a first XML processing agent of the XML processor; and
    identifying a second XML source that is processed by a second XML processing agent of the XML processor, wherein the first XML processing agent is unable to directly process the second XML source; and
    incorporating the second XML source as a metadata hidden source within an XML document, wherein the XML document includes the first XML source;
    referencing the second XML source in the first XML source; and
    automatically, via the second XML processing agent, transforming the second XML source into a format consumable by the first XML processing agent during execution.

2. The method of claim 1, wherein standards for the first XML source require that the second XML source be processed as a source external to the first XML source, wherein the automatic transformation of the section XML source causes content not previously readable by the first XML processing agent to be transformed into a lexicon document that is readable by the first XML processing agent.

3. The method of claim 1, wherein the first XML source and the second XML source are written in different XML based languages, where the XML processor is configured to process the different XML based languages using different ones of the first processing agent and the second processing agent.

4. The method of claim 1, wherein different languages comprise at least one language selected from a group of languages consisting of a VoiceXML compliant language, an Speech Recognition Grammar Specification (SRGS) compliant language, and a Pronunciation Lexicon Specification (PLS) compliant language.

5. The method of claim 1, wherein the first XML source defines a speech grammar, and wherein the second XML source defines a pronunciation lexicon for the speech grammar.

6. The method of claim 1, wherein the second XML source is a Personal-Grammar-URI (PGU) grammar that sets itself for immediate expiration by setting the http-equiv expires variable to zero.

7. The method of claim 5, wherein the first XML source references the second XML source by setting a LEXICON URI reference to a built-in handler that references the metadata.

8. The method of claim 1, wherein the first XML source conforms to an SRGS based standard, and wherein the second XML source conforms to a PLS based standard.

9. The method of claim 1, further comprising:
    the primary XML processing agent encountering a reference to the second XML source within the metadata;
    the primary XML processing agent determining a defined handler from the metadata, wherein the defined handler indicates that the secondary XML processing agent is to handle the second XML source;
    responsive to the determining, the secondary processing agent transforming the second XML source into a content stream; and
    the primary processing agent consuming the content stream and responsive to the consuming continuing to process the first XML source.

10. A method for hiding eXtensible Markup Language (XML) source in metadata to solve reference problems normally requiring multiple XML sources comprising:
    identifying XML code containing at least one metadata hidden source;
    conveying the identified code to an XML processor;
    initially ignoring, via a primary processing agent of the XML processor, content of the metadata hidden source;
    encountering, via the primary processing agent, a reference to the hidden source and assigning a secondary agent to handle the hidden source;
    transforming, via the secondary agent, the hidden source into a readable format;
    conveying the readable format to the primary processing agent as a content stream; and
    utilizing, via the primary agent, the readable format as if the content stream was from an external source.

11. The method of claim 10, wherein the primary processing agent is unable to process code of the hidden source if the primary processing agent is aware that the hidden source is included in the XML code.

12. The method of claim 10, wherein the XML processor configured to process the different XML based languages, and wherein a portion of the XML code that is not hidden in metadata is written in a different XML based language than a language which the metadata source is written in, wherein said different languages comprise at least one language selected from a group of languages consisting of a VoiceXML compliant language, an SRGS compliant language, and a PLS compliant language.

13. The method of claim 10, wherein the secondary processing agent is a built-in handler referenced by the primary processing agent.

14. The method of claim 10, wherein the identified XML code conforms to an SRGS based standard and wherein the metadata hidden source conforms to a PLS based standard.

15. The method of claim 10, wherein the metadata hidden source includes a pronunciation lexicon that is referenced by the XML code, said XML code conforming to a SRGS based standard.

* * * * *